US008670064B2

United States Patent
Kosaka

(10) Patent No.: US 8,670,064 B2
(45) Date of Patent: Mar. 11, 2014

(54) IMAGE CAPTURING APPARATUS AND CONTROL METHOD THEREFOR

(71) Applicant: Canon Kabushiki Kaisha, Tokyo (JP)

(72) Inventor: Takashi Kosaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/956,745

(22) Filed: Aug. 1, 2013

(65) Prior Publication Data

US 2013/0314569 A1 Nov. 28, 2013

Related U.S. Application Data

(63) Continuation of application No. 13/019,645, filed on Feb. 2, 2011, now Pat. No. 8,525,921.

(30) Foreign Application Priority Data

Feb. 8, 2010 (JP) ................................ 2010-025858

(51) Int. Cl.

| G03B 13/00 | (2006.01) |
| H04N 5/232 | (2006.01) |
| H04N 5/228 | (2006.01) |
| H04N 5/262 | (2006.01) |
| H04N 5/222 | (2006.01) |
| G03B 3/10 | (2006.01) |
| G03B 13/34 | (2006.01) |
| G03B 3/00 | (2006.01) |

(52) U.S. Cl.
USPC ................. 348/349; 348/222.1; 348/240.99; 348/333.01; 348/333.03; 348/345; 348/352; 348/353; 396/121; 396/124

(58) Field of Classification Search
USPC ................. 348/207.99, 222.1, 240.99–240.3, 348/333.01–333.12, 335, 345–357; 396/72–88, 121–124
See application file for complete search history.

(56) References Cited

U.S. PATENT DOCUMENTS

| 5,557,358 | A | * | 9/1996 | Mukai et al. ................... 396/296 |
| 5,589,911 | A | * | 12/1996 | Nonaka ........................... 396/80 |
| 6,163,653 | A | * | 12/2000 | Sato ................................ 396/121 |
| 6,453,124 | B2 | * | 9/2002 | Morimoto et al. .............. 396/91 |
| 6,670,992 | B2 | * | 12/2003 | Irie ................................ 348/350 |
| 6,853,401 | B2 | * | 2/2005 | Fujii et al. .................... 348/223.1 |
| 7,046,290 | B2 | * | 5/2006 | Nozaki .......................... 348/350 |
| 7,469,099 | B2 | * | 12/2008 | Terayama ...................... 396/123 |
| 7,515,197 | B2 | * | 4/2009 | Suzuki .......................... 348/345 |
| 7,706,675 | B2 | * | 4/2010 | Nozaki et al. ................. 396/123 |
| 7,734,166 | B2 | * | 6/2010 | Hamamura et al. ........... 396/104 |
| 7,941,041 | B2 | * | 5/2011 | Kishimoto et al. ............. 396/60 |

(Continued)

*Primary Examiner* — Michael Osinski

(74) *Attorney, Agent, or Firm* — Cowan, Liebowitz & Latman, P.C.

(57) ABSTRACT

An image capturing apparatus capable of switching between an optical viewfinder and live view which involves periodically reading out an image signal out of an image sensor and sequentially displaying the image signal on a display unit, comprises a phase difference focus control unit that performs auto focus control using a phase difference detection method; a selection unit that selects one of a plurality of focus detection areas used for the auto focus control; an electronic zoom unit that changes an angle of view; and a control unit that causes the phase difference focus control unit to perform auto focus control by the phase difference detection method using the selected focus detection area if the selected focus detection area is located within the changed angle of view, otherwise not to perform auto focus control by the phase difference detection method using the selected focus detection area.

3 Claims, 10 Drawing Sheets

(56) References Cited

U.S. PATENT DOCUMENTS

| | | | |
|---|---|---|---|
| 8,265,475 B2* | 9/2012 | Maeda | 396/124 |
| 8,427,556 B2* | 4/2013 | Katsumata | 348/240.99 |
| 2002/0122121 A1* | 9/2002 | Fujii et al. | 348/240 |
| 2005/0012833 A1* | 1/2005 | Yokota et al. | 348/240.99 |
| 2006/0002698 A1* | 1/2006 | Terayama | 396/123 |
| 2006/0139478 A1* | 6/2006 | Nozaki | 348/345 |
| 2007/0160359 A1* | 7/2007 | Imamura | 396/238 |
| 2008/0218596 A1* | 9/2008 | Hoshino | 348/222.1 |
| 2010/0027983 A1* | 2/2010 | Pickens et al. | 396/125 |
| 2011/0096204 A1* | 4/2011 | Katsumata | 348/240.99 |

* cited by examiner

FIG. 3A
FIG. 3B
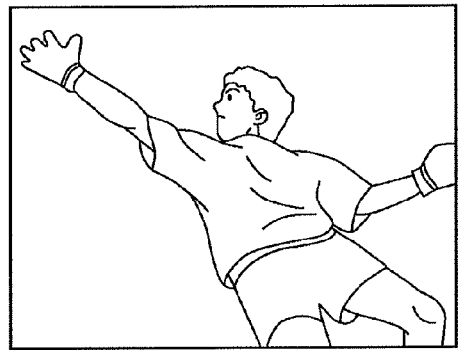

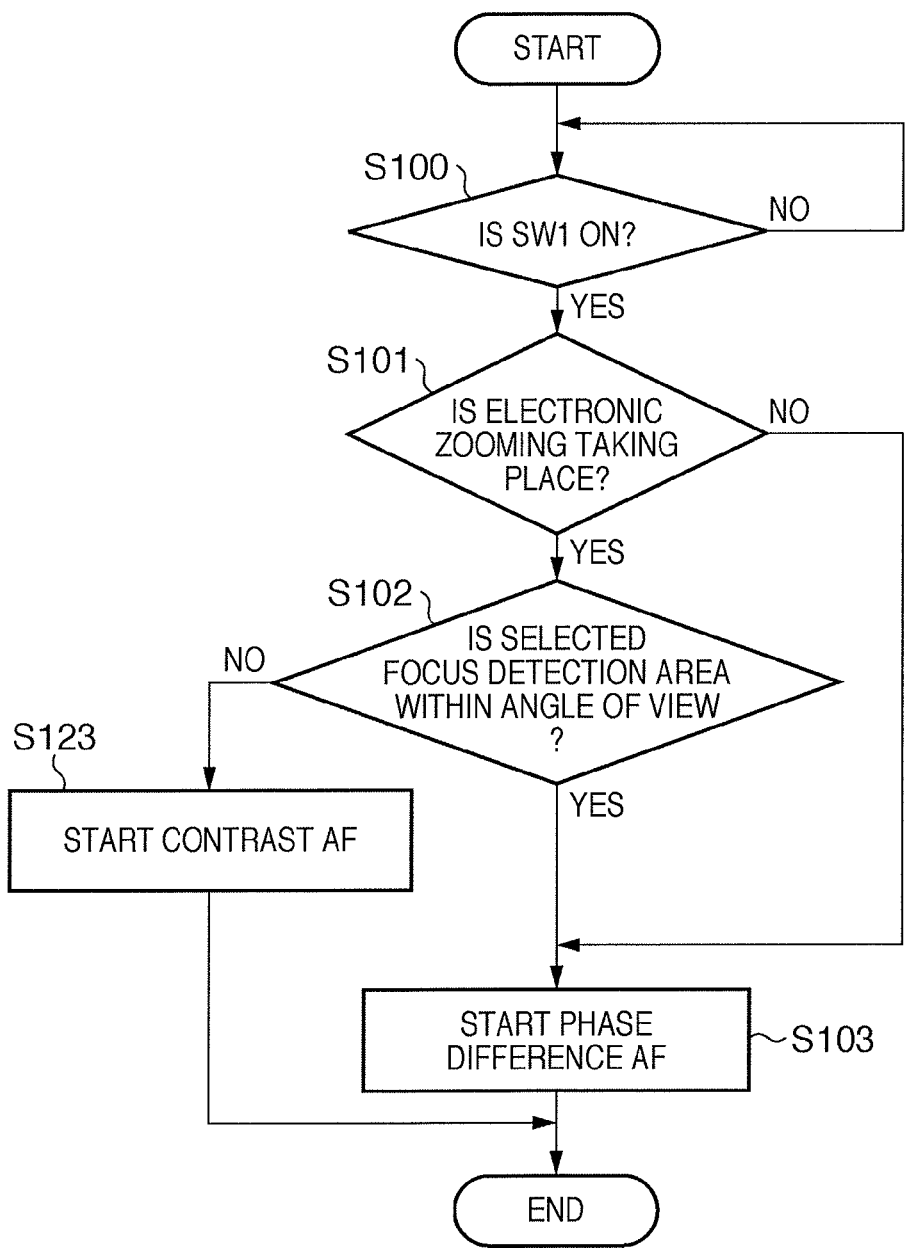

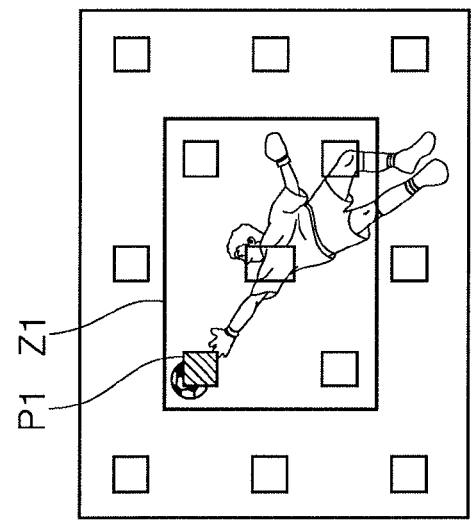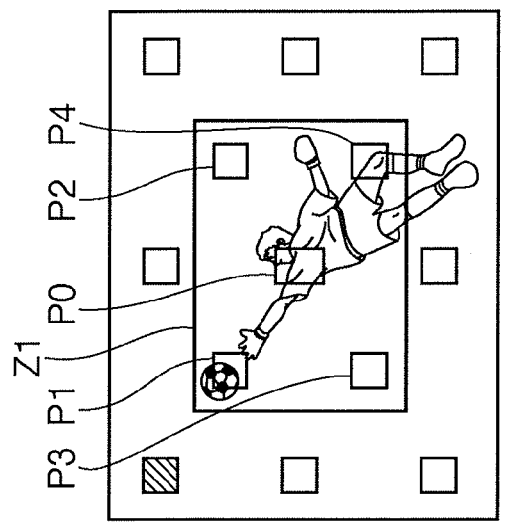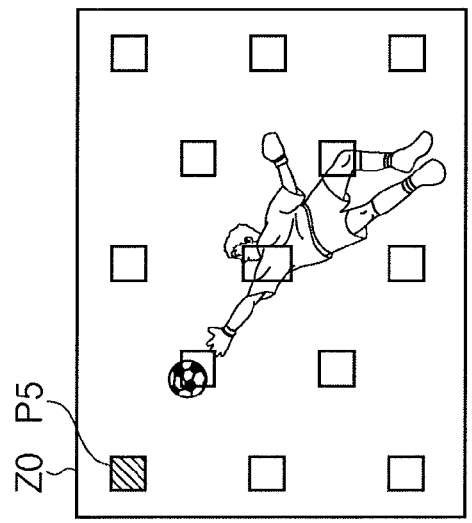

IMAGE CAPTURING APPARATUS AND CONTROL METHOD THEREFOR

CROSS-REFERENCE TO RELATED APPLICATIONS

This application is a continuation of application Ser. No. 13/019,645, filed Feb. 2, 2011 the entire disclosure of which is hereby incorporated by reference.

BACKGROUND OF THE INVENTION

1. Field of the Invention

The present invention relates to an image capturing apparatus and control method therefor which can switch between an optical viewfinder and live view.

2. Description of the Related Art

A large number of cameras equipped with an electronic viewfinder (hereinafter referred to as a live view) as well as with a conventional optical viewfinder have been proposed, where the electronic viewfinder displays images captured using an image sensor on a liquid crystal monitor or the like. The live view features tolerance for a dark environment, that is, low luminance; ease of checking for depth of field; and ease of display manipulation such as enlargement.

A single-lens reflex camera performs auto focus control (AF) using a phase difference detection method which involves separating light that has passed through an imaging lens with a separator lens, achieves focus by determining a lens displacement amount based on distances between images formed by respective beams of separated light. On the other hand, for a camera equipped with a live view function, the dominant method is a contrast method that achieves focus based on contrast of image data obtained by an image sensor.

To make full use of the features of the optical viewfinder and live view mode, a technique has been proposed which allows even a single-lens reflex camera to be used by switching between the two methods (see, for example, Japanese Patent Laid-Open No. 5-107595). When the camera is switchable between the optical viewfinder and live view mode, the AF methods work in each mode as follows. That is, AF based on the phase difference detection method (hereinafter referred to as "phase difference AF") is used with the optical viewfinder and AF based on the contrast method (hereinafter referred to as "contrast AF") is used in the live view mode. Each AF method has its features: specifically, for example, the phase difference AF provides high focusing speed while the contrast AF provides high focusing accuracy. Therefore, the user may want to perform phase difference AF when using live view, and a camera capable of switching between AF methods have also been proposed (see, for example, Japanese Patent Laid-Open No. 2001-272593).

An image capturing apparatus has also been proposed which allows electronic zooming and trim display by taking advantage of the features of live view. In this connection, it is proposed to retain a focus detection area with respect to a subject when an electronic zoom magnification is changed (see, for example, Japanese Patent Laid-Open No. 2002-209134) or to zoom around a subject area (see, for example, Japanese Patent Laid-Open No. 2005-033508).

When phase difference AF is performed in conjunction with contrast AF during the use of live view, it is conceivable to allow the user to separately set the focus detection area used for contrast AF and focus detection area used for phase difference AF. In this case, use of electronic zooming or trim display may cause the focus detection area of the phase difference AF selected by the user to move out of an angle of view of live view. Techniques described in Japanese Patent Laid-Open Nos. 5-107595, 2001-272593, 2002-209134, and 2005-033508 do not give particular consideration to these conditions. This presents a problem of poor usability, such as the need for a user to select the focus detection area of the phase difference AF anew.

SUMMARY OF THE INVENTION

The present invention has been made in consideration of the above situation, and allows a photographer to display and photograph a subject without the need to reset a focus detection area during electronic zoom operation in live view condition.

According to the present invention, provided is an image capturing apparatus capable of switching between an optical viewfinder and live view which involves periodically reading out an image signal out of an image sensor and sequentially displaying the image signal on a display unit, comprising: a phase difference focus control unit adapted to perform auto focus control using a phase difference detection method; a selection unit adapted to select a focus detection area used for the auto focus control from a plurality of focus detection areas associated with a plurality of locations on an image sensing surface of the image sensor; an electronic zoom unit adapted to change an angle of view displayed in the live view by changing a range of the image signal displayed in the live view; and a control unit adapted to cause the phase difference focus control unit to perform auto focus control by the phase difference detection method using the focus detection area selected by the selection unit if the focus detection area is located within the angle of view changed by the electronic zoom unit, and not to perform auto focus control by the phase difference detection method using the selected focus detection area if the focus detection area is not located within the changed angle of view.

Further, according to the present invention, provided is a control method for an image capturing apparatus capable of switching between an optical viewfinder and live view which involves periodically reading out an image signal out of an image sensor and sequentially displaying the image signal on a display unit and comprising a phase difference focus control unit adapted to perform auto focus control using a phase difference detection method and an electronic zoom unit adapted to change an angle of view displayed in the live view by changing a range of the image signal displayed in the live view, the control method comprising: a selection step of selecting a focus detection area used for the auto focus control from a plurality of focus detection areas associated with a plurality of locations on an image sensing surface of the image sensor; and a control step of causing the phase difference focus control unit to perform auto focus control by the phase difference detection method using the focus detection area selected in the selection step if the focus detection area is located within the angle of view changed by the electronic zoom unit, and not to perform auto focus control by the phase difference detection method using the selected focus detection area if the focus detection area is not located within the changed angle of view.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 3A and 3B are diagrams showing display examples of photographic images produced using electronic zooming;

FIGS. 5A to 5C are flowcharts showing the operation of changing an AF method during electronic zooming according to a first embodiment;

FIGS. 8A to 8C are diagrams illustrating how to change a focus detection area according to the second embodiment.

DESCRIPTION OF THE EMBODIMENTS

Exemplary embodiments of the present invention will be described in detail in accordance with the accompanying drawings.

Figure 1:
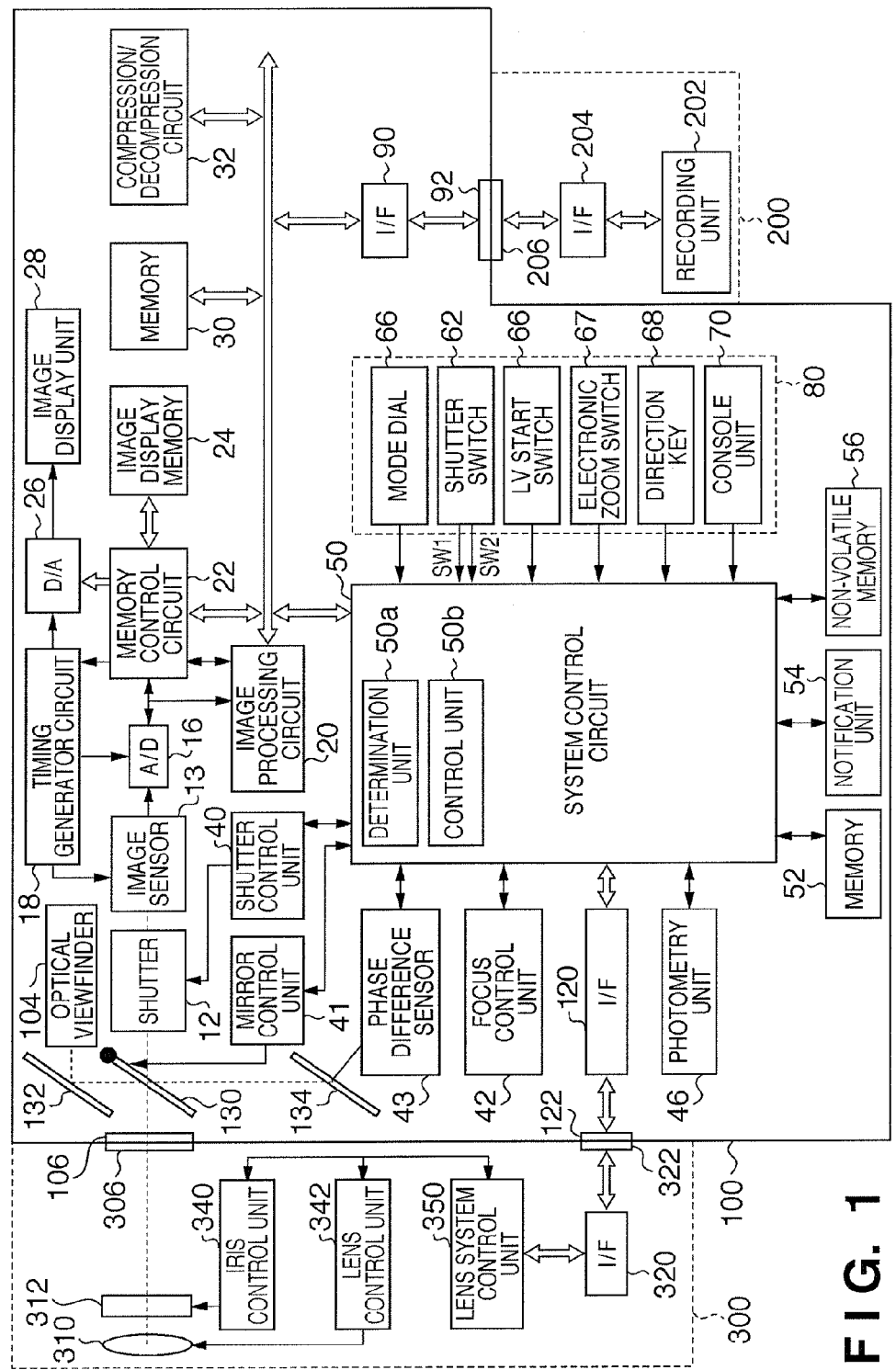
FIG. 1 is a block diagram showing a configuration of an image capturing apparatus according to an embodiment of the present invention.

As shown in FIG. 1, an image capturing apparatus according to the present embodiment mainly includes a camera body 100 and an interchangeable lens unit 300. First, the lens unit 300 will be described.

Reference numeral 310 denotes a photographing lens. A beam incident upon the photographing lens 310 is guided through an iris 312, lens mounts 306 and 106, a mirror 130, and a shutter 12, and forms an optical image on an image sensor 13. The lens mount 306 mechanically links the lens unit 300 to the camera body 100. The lens mount 306 contains various functions for electrically connecting the lens unit 300 to the camera body 100.

Reference numeral 320 denotes an interface which is used to connect the lens unit 300 to the camera body 100 in the lens mount 306. Reference numeral 322 denotes a connector used to electrically connect the lens unit 300 to the camera body 100. The connector 322 mediates exchange of control signals, state signals, data signals, and the like between the camera body 100 and lens unit 300 and has a capability to supply, and to be supplied with, power at various voltages.

Reference numeral 340 denotes an iris control unit which controls the iris 312 based on photometric information from a photometry unit 46 (described later) of the camera body 100 in conjunction with a shutter control unit 40 which controls the shutter 12. Reference numeral 342 denotes a lens control unit which controls focusing and zooming of the photographing lens 310. Reference numeral 350 denotes a lens system control unit which controls the entire lens unit 300. The lens system control unit 350 also serves the function of a non-volatile memory which holds identification information such as a unique number of lens unit 300; management information; functional information such as a maximum aperture value, minimum aperture value, and focal length; various current and past settings; and the like.

Next, a configuration of the camera body 100 will be described. The lens mount 106 mechanically links the camera body 100 with the lens unit 300. The lens mount 106 contains various functions for electrically connecting the camera body 100 with the lens unit 300.

The shutter 12 controls exposure of the image sensor 13. When the shutter 12 is open, the beam incident upon the photographing lens 310 is guided to the image sensor 13 through the iris 312, lens mounts 306 and 106, and shutter 12 by a single-lens reflex method. Then, the beam forms an image of the subject on an image sensing surface (pixel array) of the image sensor 13. During this period, the mirror 130 is driven by a mirror control unit 41 into a mirror-up state in which the mirror 130 is retracted from an optical path of the image sensor 13.

Reference numeral 104 denotes an optical viewfinder which can guide the beam incident upon the photographing lens 310 through the iris 312, lens mounts 306 and 106, and mirrors 130 and 132 using the single-lens reflex method and form and display an optical image.

The image sensor 13 generates an image signal by photoelectrically converting the image of the subject formed on the image sensing surface (pixel array), and reads and outputs the generated image signal from the pixel array. An A/D converter 16 converts the image signal (analog signal) outputted from the image sensor 13 into image data (digital signal) and outputs the resulting image data (digital signal).

A timing generator circuit 18 supplies clock signals and control signals to the image sensor 13, the A/D converter 16, and a D/A converter 26 under the control of a memory control circuit 22 and system control circuit 50.

An image processing circuit 20 performs a predetermined pixel interpolation process or color conversion process on image data outputted from the A/D converter 16 or image data outputted from the memory control circuit 22, and outputs the processed image data.

The memory control circuit 22 controls the A/D converter 16, the timing generator circuit 18, the image processing circuit 20, an image display memory 24, the D/A converter 26, a memory 30, and a compression/decompression circuit 32. The image data outputted from the A/D converter 16 is written into the image display memory 24 or memory 30 via the image processing circuit 20 and memory control circuit 22 or directly via the memory control circuit 22.

The image display memory 24 temporarily stores image data that is to be displayed on an image display unit 28. The D/A converter 26 accesses image display memory 24 via the memory control circuit 22 and acquires the image data to be displayed. The D/A converter 26 converts the image data to be displayed into an image signal (analog signal) for display and supplies the image signal to the image display unit 28. The image display unit 28 displays an image based on the image signal for display. The image display unit 28 includes, for example, a TFT-LCD.

The memory 30 temporarily stores image data of a photographed still image. Also, the memory 30 can be used as a work area for the system control circuit 50.

The compression/decompression circuit 32 compresses or decompresses image data using an adaptive discrete cosine transform (ADCT) process or the like. The compression/decompression circuit 32 reads the image data stored in the memory 30, performs a compression process or decompression process, and writes the processed image data in the memory 30 for storage.

The shutter control unit 40 controls the shutter 12 based on photometric information from the photometry unit 46 in conjunction with the iris control unit 340 that controls the iris 312. The shutter control unit 40 drives the shutter 12 so as to expose the image sensor 13. The mirror control unit 41 drives the mirror 130 to a mirror-up position or mirror-down position via a mirror drive mechanism (not shown).

A focus control unit 42 performs an AF process (focus control process). The beam incident upon the photographing lens 310 is guided through the iris 312 and lens mounts 306 and 106 by the single-lens reflex method and transmitted through a half-mirror portion of the mirror 130. Then, the beam forms an image on a phase difference sensor 43 via a focus control submirror 134. Based on image data obtained from the phase difference sensor 43, the focus control unit 42 detects focus state by focus control based on the phase difference detection method (hereinafter referred to as "phase difference AF") and supplies detection results to the system control circuit 50.

The focus control unit 42 can also perform focus control based on the contrast method (hereinafter referred to as "contrast AF") during live view display. In that case, the focus control unit 42 determines an AF evaluation value (contrast) of the image from image data stored in the memory 30, and controls the photographing lens 310 so as to maximize the AF evaluation value. Control methods available for use to maximize the AF evaluation value include a publicly known technique such as a hill climbing method. According to the present embodiment, out of the image data stored in the memory 30, the image data for live view display is used to determine the AF evaluation value (contrast) for contrast AF.

The photometry unit 46 performs an AE process (photometric process). The photometry unit 46 detects an exposure state of an image formed as an optical image by the beam that is incident upon the photographing lens 310 and guided through the iris 312, the lens mounts 306 and 106, the mirrors 130 and 132, and a photometric lens (not shown) by the single-lens reflex method. Then, the photometry unit 46 supplies detection results to the system control circuit 50. Alternatively, the photometry unit 46 can detect the exposure state by making the image processing circuit 20 perform computations on image data captured by the image sensor 13.

The system control circuit 50 performs overall control over various parts of the camera body 100. The system control circuit 50 includes a determination unit 50a and control unit 50b. The determination unit 50a determines whether a phase difference focus detection area which can be used for focus detection exists in the angle of view. The control unit 50b determines operation of the focus control unit 42 based on a determination result produced by the determination unit 50a. Detailed operation of the determination unit 50a and control unit 50b will be described later. A memory 52 stores constants, variables, programs, and the like for operation of the system control circuit 50.

A notification unit 54 includes a liquid crystal display and speaker which present operating status, messages, or the like according to execution of programs by the system control circuit 50, using characters, images, voice, or the like. One or more notification units 54 may be installed in visible locations near a console unit of the camera body 100. The notification unit 54, for example, is made up of a combination of an LCD, LEDs, a sound-generator, and the like. Also, part of functionality of the notification unit 54 is installed in the optical viewfinder 104. Among display contents of the notification unit 54 information displayed on the LCD or the like includes, for example, a single shot/continuous shot indicator, remaining shot indicator, shutter speed indicator, f-stop indicator, exposure correction indicator, flash correction indicator, and battery power indicator.

Also, information displayed on the optical viewfinder 104 out of the display contents of the notification unit 54 includes, for example, a focus indicator, flash charge completion indicator, shutter speed indicator, f-stop indicator, and exposure correction indicator. Furthermore, information provided by the LED and the like out of the display contents of the notification unit 54 includes, for example, a media write indicator. Besides, information provided by a lamp and the like out of the display contents of the notification unit 54 includes, for example, a self-timer indicator lamp.

A non-volatile memory 56 is an electrically recordable/erasable memory. The non-volatile memory 56 can be, for example, an EEPROM.

An input unit 80 accepts various operation commands issued to the system control circuit 50 from the user. The input unit 80 includes one or more combinations of switches, dials, and the like. According to the present embodiment, the input unit 80 includes a mode dial 60, shutter switch 62, live view (LV) start switch 66, electronic zoom switch 67, direction key, and console unit 70.

The mode dial 60 accepts a command specifying any of multiple shooting modes including normal shooting mode and continuous shooting mode. When a command specifying the continuous shooting mode is accepted, the mode dial 60 transfers the command to the system control circuit 50.

The shutter switch 62 accepts a different command depending on whether the shutter switch 62 is depressed to a first position or second position. When depressed to the first position (e.g., half-pressed), the shutter switch 62 accepts a first command and turns on a first switch SW1 in response. That is, in response to the first command, the shutter switch 62 supplies a command to start an AF process, AE process, EF process, and the like to the system control circuit 50.

On the other hand, when depressed to a second position (e.g., full-pressed), the shutter switch 62 accepts a second command and turns on a second switch SW2 in response. That is, in response to the second command, the shutter switch 62 supplies a command to start a series of shooting processes including an exposure process, development process, and recording process to the system control circuit 50. The exposure process involves writing a signal read out of the image sensor 13 into the memory 30 as image data via the A/D converter 16 and memory control circuit 22. The development process uses computations performed by the image processing circuit 20 and memory control circuit 22. The recording process involves reading image data out of the memory 30, compressing the image data using the compression/decompression circuit 32, and writing the resulting image data into a recording medium 200.

The live view (LV) start switch 66 is used to start live view mode. When turned on, the live view start switch 66 causes the mirror 130 to flip up, the shutter 12 to open, an optical image to be formed on the image sensor 13, and live view operation to be started. During the live view operation, image signals are periodically read out of the image sensor 13, and the image signals read out are displayed sequentially on the image display unit. In this way, the image capturing apparatus according to the present embodiment allows switching between the optical viewfinder 104 and live view.

The electronic zoom switch 67 is used to specify a zoom magnification of electronic zooming and the direction key 68 is used to move electronic zoom position.

The console unit 70 includes various buttons and the like. Specifically, the console unit 70 includes, for example, a menu button, play button, set button, single shot/continuous shot/self-timer selector button, image quality selection button, an ISO sensitivity selection button, an exposure correction button, a flash correction button, a white balance mode setting switch for use to select a white balance mode, a dial for use to select among various settings, and the like.

An interface 120 is intended to connect the camera body 100 with the lens unit 300 in the lens mount 106. A connector 122 is intended to electrically connect the camera body 100 with the lens unit 300. Also, the connector 122 mediates exchange of control signals, state signals, data signals, and the like between the camera body 100 and lens unit 300 and has a capability to supply power at various voltages.

The recording medium 200 may be a memory card, hard disk, or the like. The recording medium 200 includes a recording unit 202, interface 204, and connector 206. The recording unit 202 includes a semiconductor memory, magnetic disk, or the like. The interface 204 is used to interface with the camera body 100. The connector 206 is used to connect to the camera body 100.

Figure 2:
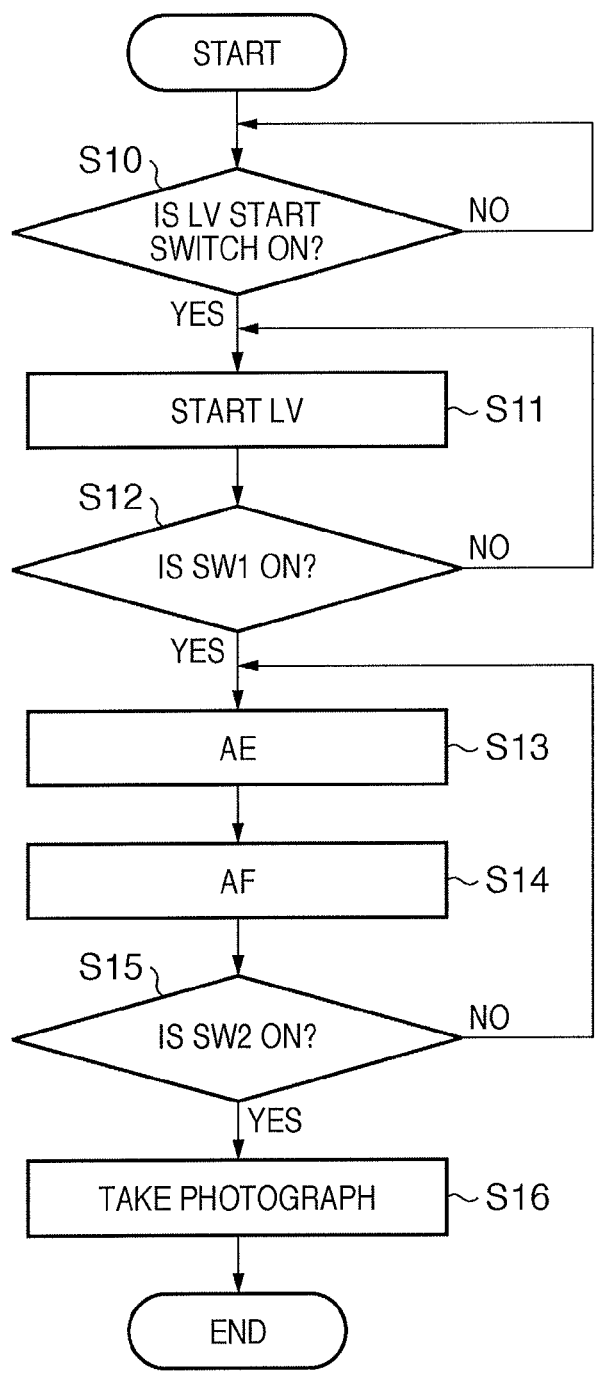
FIG. 2 is a flowchart showing phase difference AF operation in live view condition.

Live view and phase difference AF operation in live view condition in the image capturing apparatus of the above configuration will be described with reference to a flowchart in FIG. 2.

First, in step S10, the flow waits for the live view start switch 66 to be turned on. Once the live view start switch 66 is turned on, the flow goes to step S11 to start live view. That is, as described above, the mirror 130 is flipped up, the shutter 12 is opened, and live view mode is entered. In the live view mode, real-time images processed by the image processing circuit 20 are displayed in the image display unit 28 for live view display. In step S12 next, state of the switch SW1 is checked. If the switch SW1 is off, the flow returns to step S11.

On the other hand, if the switch SW1 is on, the flow goes to step S13, where the image processing circuit 20 performs an AE process.

Next, in step S14, phase difference AF is performed with the mirror 130 returned to such a position as to direct the beam incident upon the photographing lens 310 at the phase difference sensor 43 via the focus control submirror 134. When AF is finished, thereby achieving focus, or when SW1 is turned off, the mirror 130 is flipped up again to return to live view operation. If SW1 is turned off, the flow returns to step S11 although not illustrated here.

Next, in step S15, state of the switch SW2 is checked. If the switch SW2 is off, the flow returns to step S13. On the other hand, if the switch SW2 is on, the flow goes to step S16 to photograph and record a still image. In the still image photography, since the mirror 130 is already at mirror-up position which allows an optical image to be formed on the image sensor 13, there is no need to drive the mirror 130. Alternatively, however, by returning the mirror 130 and shutter 12 to a standby state once (with the mirror 130 put down and the shutter 12 closed), mirror-up operation may be started again to take a photograph.

Figure 4:
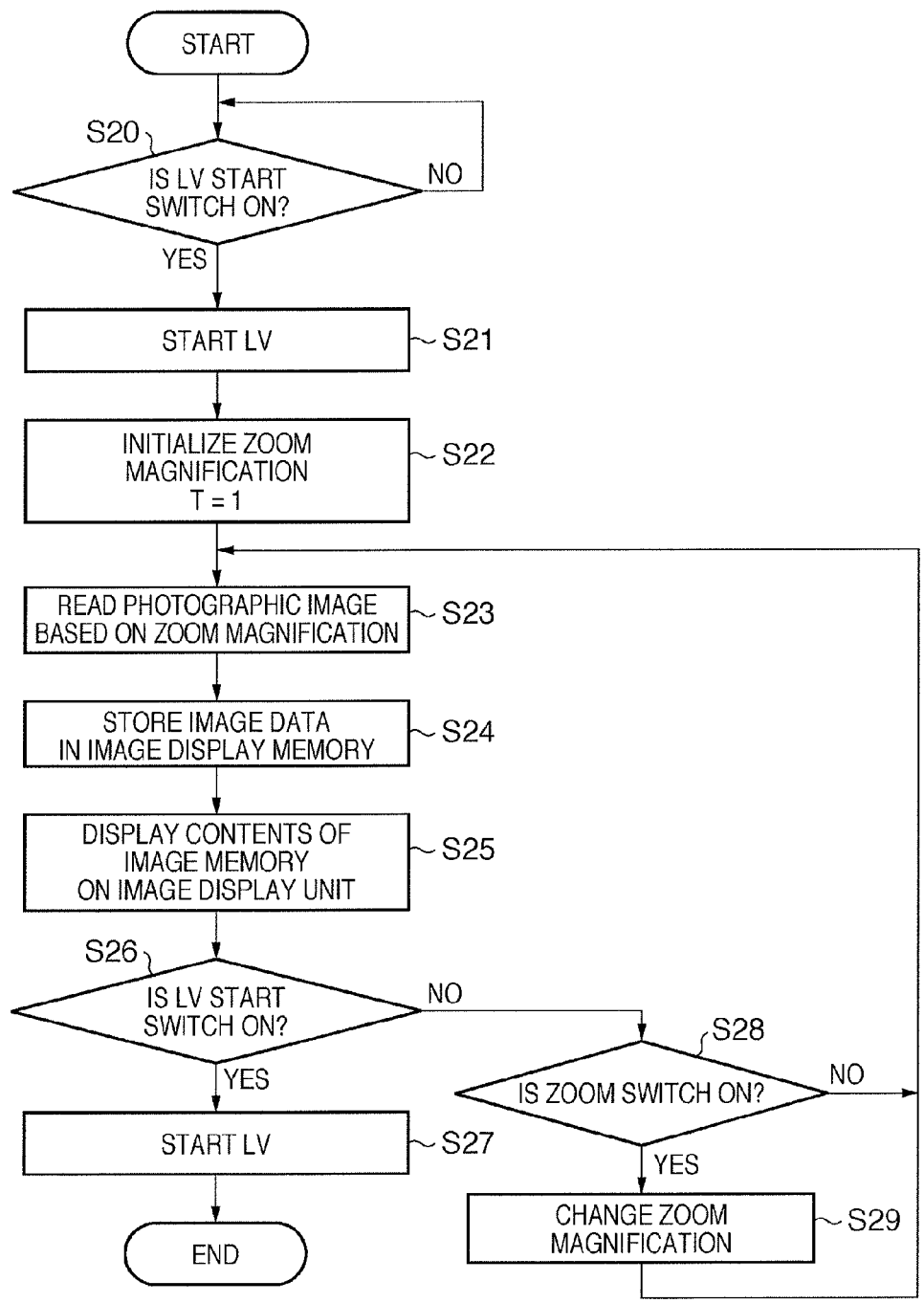
FIG. 4 is a flowchart showing electronic zoom operation.

Next, operation during electronic zooming will be described with reference to FIGS. 3A and 3B and a flowchart in FIG. 4. FIGS. 3A and 3B show display contents of the image display unit 28 during live view display and after electronic zooming, respectively. Once the live view start switch is operated in step S20 in FIG. 4, live view is started and the shutter 12 is opened in step S21.

In step S22, an electronic zoom magnification T of the photographic image is initialized to 1. In step S23, the image signal read out of the image sensor 13 is converted into image data by the A/D converter 16, and the image data is stored in the image display memory 24 in step S24. In so doing, a partial area is read out of the image sensor 13 based on the electronic zoom magnification T. In this case, since the electronic zoom magnification T is 1, the entire area of image sensor 13 is read out. Next, in step S25, contents of the image display memory 24 are displayed in the image display unit 28.

Next, in step S26, it is checked whether the live view start switch has been operated again. If the live view start switch has been operated, the live view is finished in step S27. If it is found in step S26 that the live view start switch has not been operated again, the live view is continued, and it is checked in step S28 whether or not the electronic zoom switch 67 is operated. If the electronic zoom switch 67 is operated, the zoom magnification T is updated according to a concrete operation (step S29). Then, the flow returns to step S23, where a partial area is read out of the image sensor 13 based on the electronic zoom magnification T. The center of the partial area read out coincides with the center of the photographic image and the angle of view read out (vertical and horizontal lengths) is 1/T. That is, a subject image is displayed in the image display unit 28 at the same scale as when focal length of the photographing lens 310 is multiplied by T. An image before electronic zooming is shown in FIG. 3A and an image after the electronic zooming is shown in FIG. 3B.

Shape of the electronic zoom switch 67 is not particularly limited. For example, if a single button-shaped operation member is used, the zoom magnification T can be increased with the press of the button, and when a predetermined upper limit is reached, the zoom magnification T can be initialized to 1 to return to a full-size display. Alternatively, a +/− rocker key may be used. In that case, the zoom magnification T can be increased with the press of the + side, and decreased with the press of the − side.

Also, the electronic zoom position may be moved using the direction key 68. In that case, the center of the partial area read out based on the electronic zoom magnification T is moved by the direction key 68.

The area of the image sensor 13 from which image signals are read may be changed according to the electronic zoom magnification T or the image signals for the area to be displayed may be extracted from the image signals which have been read from all pixels in the image sensor 13.

<First Embodiment>

Operation performed by the control unit 50b to change an AF method during electronic zooming according to a first embodiment of the present invention will be described below with reference to flowcharts in FIGS. 5A to 5C. Operation in live view condition will be described here. The operation of changing to live view has already been described above, and thus description thereof will be omitted.

First, with reference to FIG. 5A, description will be given of the process of disabling phase difference AF when a selected focus detection area is not located within the angle of view after electronic zooming. In step S100, the state of the switch SW1 is checked. If the switch SW1 is on, the flow goes to step S101 to determine whether electronic zooming is taking place. Whether electronic zooming is taking place can be determined by checking the zoom magnification T. If electronic zooming is taking place, the flow goes to step S102. Otherwise, the flow goes to step S103 to perform phase difference AF using the selected focus detection area.

Figure 6A:
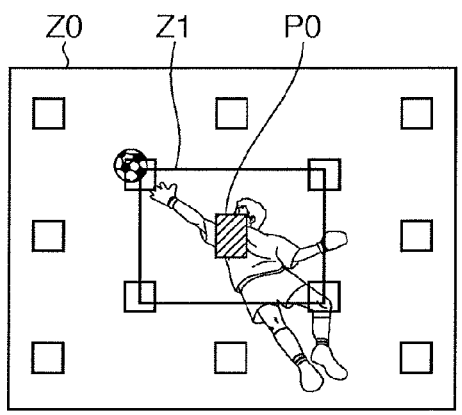
FIGS. 6A and 6B are diagrams showing examples of relationship between a selected focus detection area and an angle of view after electronic zooming.
Figure 6B:
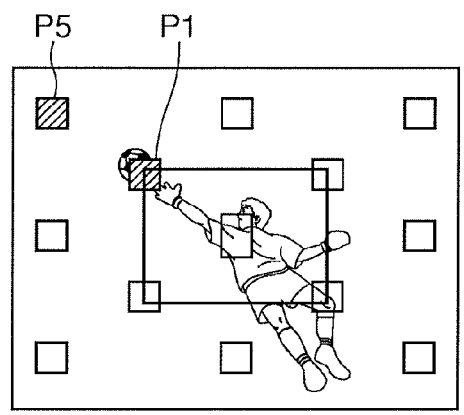

In step S102, the determination unit 50a determines whether the selected focus detection area is located within the angle of view after electronic zooming. An example in which a selected focus detection area is located within the angle of view after electronic zooming and an example in which a selected focus detection area is not located within the angle of view after electronic zooming are shown in FIGS. 6A and 6B, respectively. In FIG. 6A, Z0 is the angle of view in the case of a full-screen display, that is, a full-size setting (T=1) while Z1 is the angle of view after electronic zooming. The image display unit 28 displays an image such as shown in FIG. 3A when the angle of view is Z0, and an image such as shown in FIG. 3B when the angle of view is Z1.

Rectangles in FIG. 6A excluding Z0 and Z1 represent multiple selectable phase difference focus detection areas associated with multiple predetermined locations of the image sensor 13 in the image capturing apparatus according to the first embodiment. A hatched phase difference focus detection area P0 out of the selectable phase difference focus detection areas is a selected focus detection area, selected by a photographer. The selection can be made, for example, via the console unit 70. On the other hand, FIG. 6B shows how hatched phase difference focus detection areas P1 and P5 have been selected. In the example of FIG. 6A, the selected focus detection area P0 is located within the angle of view after electronic zooming. On the other hand, in the example of FIG. 6B, the selected focus detection areas P1 and P5 are not located within the angle of view after electronic zooming. A possible determination method available for use by the determination unit 50a involves prestoring the center coordinates of selectable focus detection areas in the memory 52, comparing them with the center coordinates of a read partial area and the zoom magnification T during electronic zooming, and thereby determining whether the selected focus detection area is located within the angle of view after electronic zooming.

If it is determined by the determination unit 50a that the selected focus detection area is located within the angle of view after electronic zooming, the flow goes to step S103 to perform phase difference AF using the selected focus detection area. Otherwise, the processing is finished without performing phase difference AF.

This makes it possible, when the selected focus detection area preset by the photographer is not located within the angle of view after electronic zooming, to prevent the problem of performing AF on a focus detection area outside the angle of view and consequently photographing an image which is not focused on any area within a screen. Also, since AF is not performed, the photographer can manually adjust focus as required.

Figure 5A:
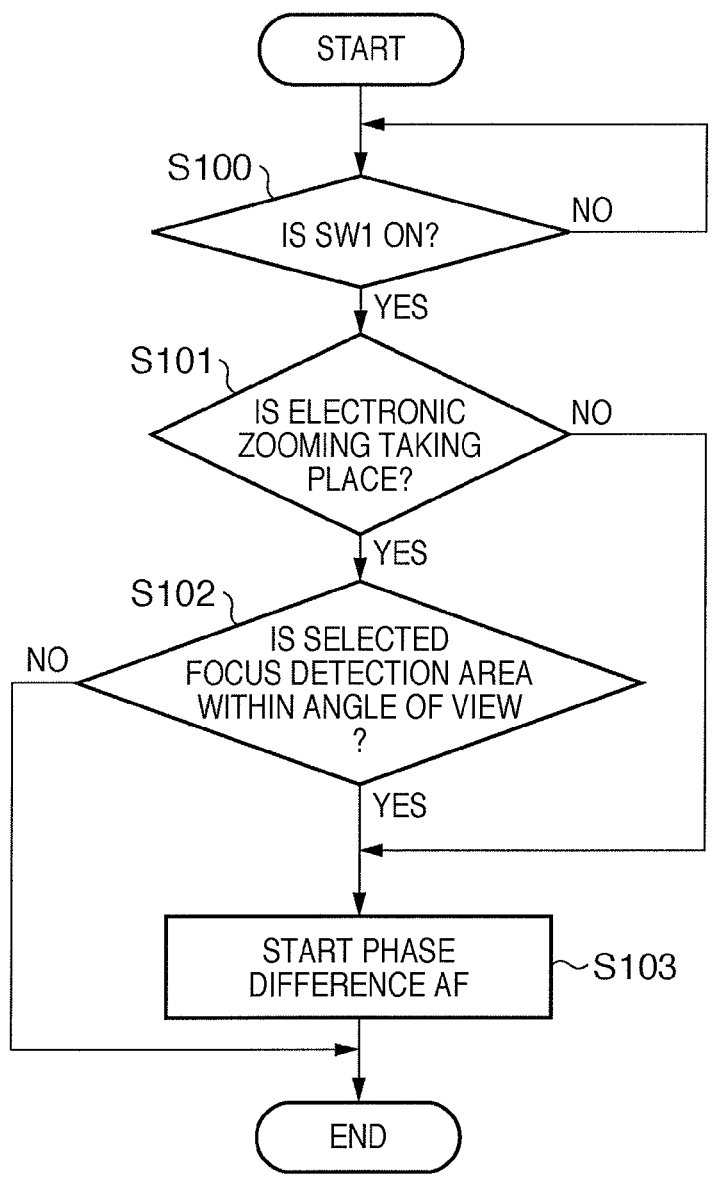
Figure 5B:
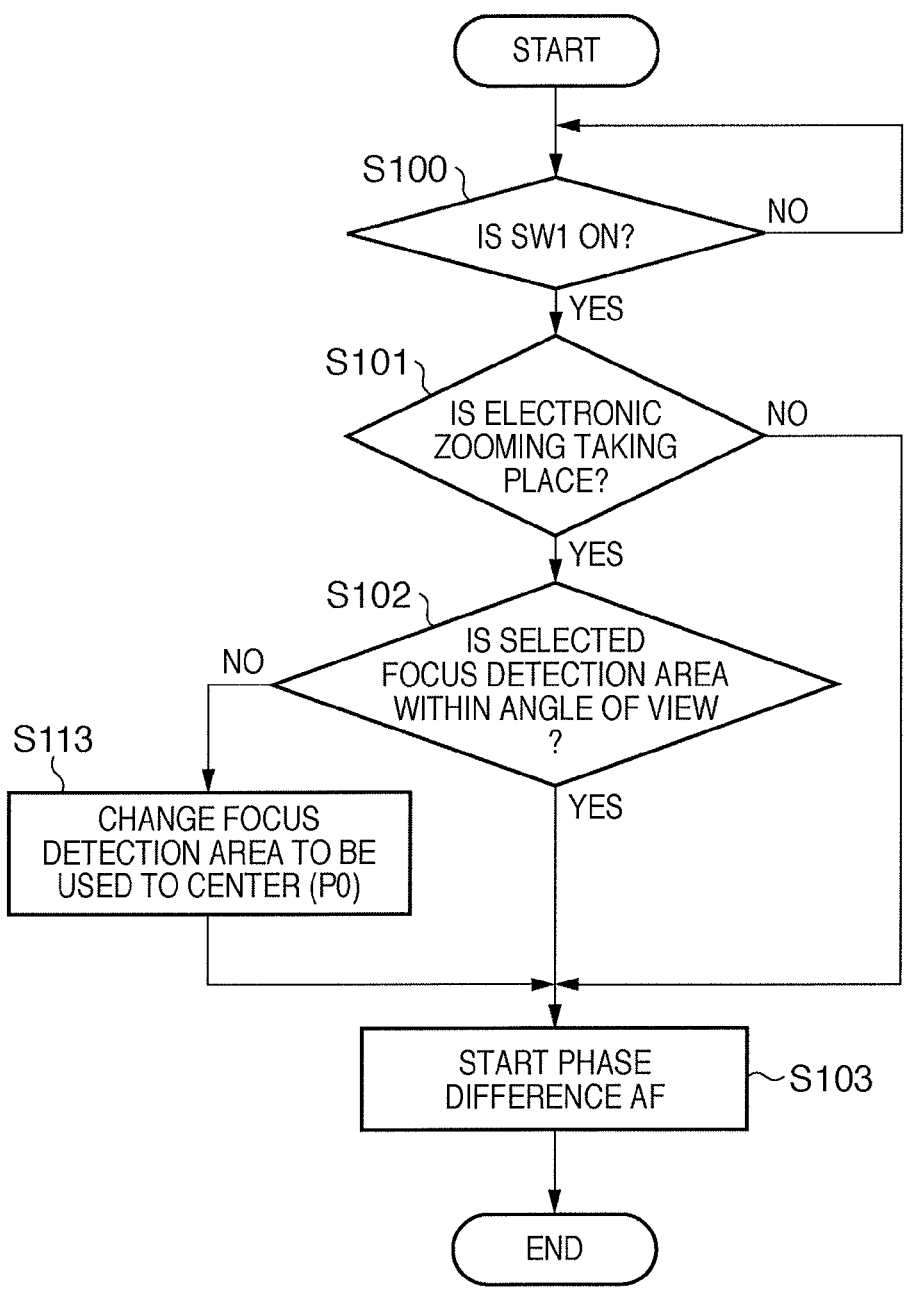

Although the example described with reference to FIG. 5A involves disabling phase difference AF when a selected focus detection area is not located within the angle of view after electronic zooming, alternatively the focus detection area to be used for phase difference AF may be changed to a central one as shown in FIG. 5B. Incidentally, the same processes as those in FIG. 5A are denoted by the same step numbers as the corresponding steps in FIG. 5A, and description thereof will be omitted. With the procedures shown in FIG. 5B, if the determination unit 50a determines in step S102 that the selected focus detection area is not located within the angle of view after electronic zooming, the focus detection area to be used for phase difference AF is temporarily changed, in step S113, from the selected focus detection area established by the photographer to the phase difference focus detection area located in the center of the screen. Then, in step S103, phase difference AF is started using the temporary phase difference focus detection area in the center of the screen.

Furthermore, as shown in FIG. 5C, the AF method can be changed from phase difference AF to contrast AF. Incidentally, the same processes as those in FIG. 5A are denoted by the same step numbers as the corresponding steps in FIG. 5A, and description thereof will be omitted. With the procedures shown in FIG. 5C, if the determination unit 50a determines in step S102 that the selected focus detection area is not located within the angle of view after electronic zooming, the control unit 50b temporarily changes the AF method to contrast AF and performs contrast AF in step S123.

As described above, according to the first embodiment, the AF method is changed when a selected focus detection area is not located within the angle of view after electronic zooming. Specifically, phase difference AF is disabled, the focus detection area to be used is changed to the central focus detection area, or contrast AF is performed instead of phase difference AF. This makes it possible, when the selected focus detection area preset by the photographer is not located within the angle of view after electronic zooming, to prevent the problem of performing phase difference AF on a focus detection area outside the angle of view and consequently photographing an image which is not focused on any area within the screen.

<Second Embodiment>

Figure 7:
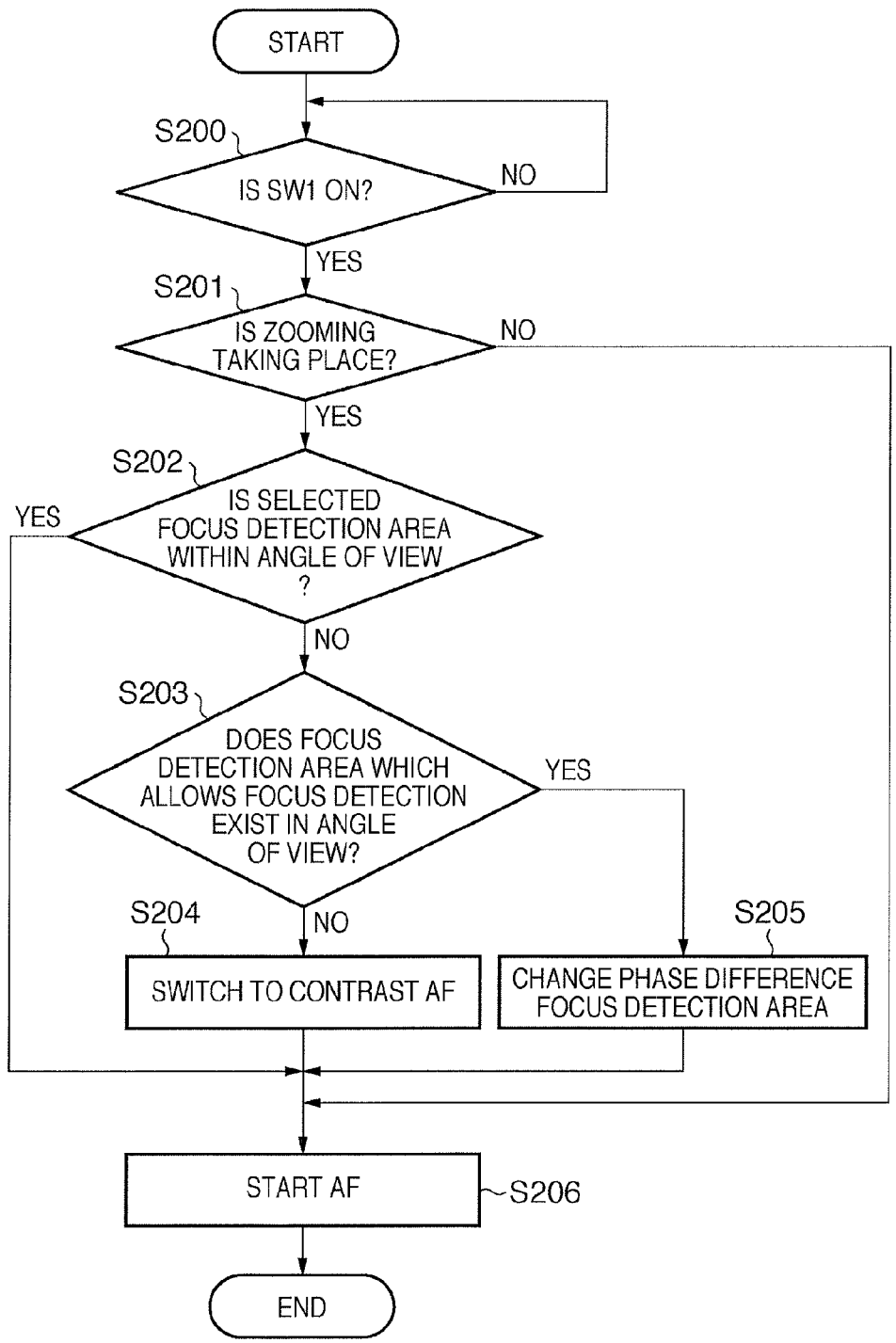
FIG. 7 is a flowchart showing the operation of switching a focus detection area after electronic zooming according to a second embodiment.

Next, an AF process during electronic zooming according to a second embodiment of the present invention will be described with reference to a flowchart in FIG. 7. According to the second embodiment, when a selected focus detection area is not located within the angle of view after electronic zooming, the control unit 50b selects the phase difference focus detection area closest to a location relatively corresponding to the selected focus detection area. Operation in live view condition will be described here. The operation of changing to live view has already been described above, and thus description thereof will be omitted.

In step S200, the state of the switch SW1 is checked. If the switch SW1 is on, the flow goes to step S201 to determine whether electronic zooming is taking place. Whether electronic zooming is taking place can be determined by checking the zoom magnification T. If electronic zooming is taking place, the flow goes to step S202. Otherwise, the flow goes to step S206 to perform phase difference AF using the selected focus detection area.

In step S202, the determination unit 50a determines whether the selected focus detection area is located within the angle of view after electronic zooming. If it is determined by the determination unit 50a that the selected focus detection area is located within the angle of view after electronic zooming, the flow goes to step S206 to perform phase difference AF using the selected focus detection area. Otherwise, the flow goes to step S203 to determine whether a phase difference focus detection area which allows phase difference AF exists in the angle of view after electronic zooming. If no phase difference focus detection area which would allow focus detection exists in the angle of view after electronic zooming, the flow goes to step S204 to select contrast AF as the AF method. Then, contrast AF is started in step S206.

On the other hand, if it is found in step S203 that a phase difference focus detection area which allows focus detection exists in the angle of view, the flow goes to step S205. In step S205, among the phase difference focus detection areas located within the angle of view after electronic zooming, the selected focus detection area is changed to a phase difference focus detection area which allows focus detection and relatively corresponds to the location of the selected focus detection area existing in the angle of view before the electronic zooming, that is, in full-screen display. Then, phase difference AF is performed using the selected focus detection area.

Now, a concrete example of how a focus detection area is selected in steps S203 and S205 will be described with reference to FIGS. 8A to 8C. Assuming that a phase difference focus detection area P5 in FIG. 8A is a selected focus detection area set by the photographer, FIG. 8B shows an angle of view Z1 after electronic zooming when the electronic zooming is performed through operation of the electronic zoom switch 67. In step S203, a focus detection area for phase difference AF is searched for in the angle of view Z1 obtained after electronic zooming. In this example, search results are P0, P1, P2, P3, and P4 shown in FIG. 8B. A possible search method involves prestoring the center coordinates and focus detection ranges of selectable focus detection areas in the memory 52, comparing them with the center coordinates of a partial area read during electronic zooming and the coordinates of four corners of the angle of view after the electronic zooming determined from the zoom magnification T, and thereby determining whether the selected focus detection area is located within the angle of view after electronic zooming.

In step S205, a focus detection area which allows focus detection and relatively corresponds to the location of the selected focus detection area for the full screen is selected from among the search results produced in S203. A search result is P1 in FIG. 8C. A possible selection method involves determining coordinates corresponding to the angle of view after zooming from the coordinates which represent the location of the selected focus detection area in the full screen. If, for example, the coordinates of a screen center are (0, 0) and the coordinates $P5\_Z0$ of the selected focus detection area $P5$ are $(x, y)$, corresponding coordinates $P5\_Z1$ after zooming can be determined as $(x/T, y/T)$ from the zoom magnification T. Next, the phase difference focus detection area which allows focus detection and is closest to the coordinates $P5\_Z1$ is selected from the coordinates of the focus detection areas stored in the memory 52.

In the second embodiment described above, the phase difference focus detection area closest to the location relatively corresponding to the selected focus detection area for the full screen is selected during electronic zooming. This allows the photographer to perform phase difference AF without reselecting a focus detection area and without feeling awkward even when the selected focus detection area preset by the photographer is not located within the angle of view obtained after electronic zooming. On the other hand, when a phase difference focus detection area which allows focus detection does not exist in the angle of view after electronic zooming, contrast AF is performed. This makes it possible to focus on a subject in the angle of view and prevent the problem of photographing an image which is not focused on any area within the screen.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-025858, filed on Feb. 8, 2010 which is hereby incorporated by reference herein in its entirety.

What is claimed is:

1. An image capturing apparatus that has a display mode which involves periodically reading out an image signal out of an image sensor and sequentially displaying the image signal on a display unit, comprising:
    a focus control unit to perform auto focus control;
    a selection unit to select a focus detection area used for the auto focus control from a plurality of focus detection areas associated with a plurality of locations on an image sensing surface of the image sensor;
    an electronic zoom unit to change an angle of view displayed in the display mode by changing a range of the image signal displayed in the display mode; and
    a control unit to cause said focus control unit to perform auto focus control using the focus detection area selected by said selection unit if the focus detection area is located within the angle of view changed by said electronic zoom unit,
    wherein if the focus detection area selected by said selection unit is not located within the changed angle of view, said control unit determines whether any of the plurality of focus detection areas exists in the changed angle of view; and
    if any of the plurality of focus detection areas exists in the changed angle of view, said control unit changes the focus detection area used for the auto focus control to a focus detection area which relatively corresponds to the selected focus detection area and which is closest to a location of the changed angle of view out of the focus detection areas existing in the changed angle of view and performs auto focus control using the changed focus detection area.

2. The image capturing apparatus according to claim 1, wherein if the focus detection area selected by said selection unit is not located within the changed angle of view, and if said control unit determines that none of the plurality of focus detection areas exists in the changed angle of view, said control unit makes said focus control unit perform auto focus control by a contrast method.

3. A control method for an image capturing apparatus having a display mode which involves periodically reading out an image signal out of an image sensor and sequentially displaying the image signal on a display unit and comprising a focus control unit to perform auto focus control and an electronic zoom unit to change an angle of view displayed in the display mode by changing a range of the image signal displayed in the display mode, the control method comprising:
    a selection step of selecting a focus detection area used for the auto focus control from a plurality of focus detection areas associated with a plurality of locations on an image sensing surface of the image sensor; and
    a control step of causing the focus control unit to perform auto focus control using the focus detection area selected in said selection step if the focus detection area is located within the angle of view changed by the electronic zoom unit,
    wherein if the focus detection area selected by said selection step is not located within the changed angle of view, said control step determines whether any of the plurality of focus detection areas exists in the changed angle of view; and
    if any of the plurality of focus detection areas exists in the changed angle of view, said control step changes the focus detection area used for the auto focus control to a focus detection area which relatively corresponds to the selected focus detection area and which is closest to a location of the changed angle of view out of the focus detection areas existing in the changed angle of view and performs auto focus control using the changed focus detection area.

* * * * *